US005672644A

United States Patent [19]

Inoue

[11] Patent Number: 5,672,644
[45] Date of Patent: Sep. 30, 1997

[54] LIGHT RESISTANT POLYPHENYLENE ETHER RESIN COMPOSITIONS

[75] Inventor: Kazushige Inoue, Moka, Japan

[73] Assignee: General Electric Co., Pittsfield, Mass.

[21] Appl. No.: 638,399

[22] Filed: Apr. 26, 1996

Related U.S. Application Data

[63] Continuation of Ser. No. 360,540, Dec. 21, 1994, abandoned.

[30] Foreign Application Priority Data

Dec. 22, 1993 [JP] Japan ................................. 5-345697

[51] Int. Cl.$^6$ ................................................. C08K 5/34
[52] U.S. Cl. ........................................................ 524/99
[58] Field of Search ................................ 524/99, 102

[56] References Cited

U.S. PATENT DOCUMENTS

| | | | |
|---|---|---|---|
| 4,178,279 | 12/1979 | Uhrhan et al. | 528/60 |
| 4,555,538 | 11/1985 | Shu | 524/102 |
| 4,636,408 | 1/1987 | Anthony et al. | 427/160 |
| 4,668,739 | 5/1987 | Berdahl et al. | 525/132 |
| 4,785,076 | 11/1988 | Shu | 524/91 |
| 4,835,201 | 5/1989 | Bopp | 524/102 |
| 4,843,116 | 6/1989 | Bopp | 524/102 |
| 5,026,751 | 6/1991 | Bopp | 524/102 |
| 5,045,578 | 9/1991 | Claesen et al. | 524/99 |
| 5,055,494 | 10/1991 | van der Meet | 521/61 |
| 5,326,807 | 7/1994 | Kato et al. | 524/413 |

*Primary Examiner*—Kriellion S. Morgan

[57] ABSTRACT

Compositions of polyphenylene ether resins and a hindered amine compound that contains an amino group, optionally with polystyrene or modified polystyrene resins, provide improved light resistance over compositions containing a hindered amine compound without an amino group. Good impact resistance and heat resistance are maintained in the present compositions.

12 Claims, No Drawings

LIGHT RESISTANT POLYPHENYLENE ETHER RESIN COMPOSITIONS

This is a continuation of Ser. No. 08/360,540 filed on Dec. 12, 1994 now abandoned.

BACKGROUND OF THE INVENTION

1. Field of the Invention

The present invention relates to a polyphenylene ether (hereinafter called PPE) type resin composition with an improved fight resistance.

2. Description of the Related Art

PPE-type resins have an excellent heat resistance. At the same time, they excel in terms of mechanical strength, electrical characteristics, water resistance, difficult combustibility, etc. There are a variety of applications as a molded resin material. However, PPE-type resins have poor light resistance. During long-term exposure to light, the surface changes color. There is a drawback of the damage of color tone. In order to improve this point, a variety of stabilizers conventionally has been added.

For example, methods using the additives described in Japanese Kokai Patent Application Nos. Sho 59[1984]-8752, Sho 59[11984]-8751 and so on can be mentioned. However, these stabilizers decompose and scatter during the melt-kneading process for the manufacture of the composition. The light resistance, therefore, cannot be effectively improved. Also, if a large amount of a stabilizer is used, this will lead to a reduction in the heat resistance and mechanical characteristics.

The present invention has an objective to provide a PPE-type resin composition with an improved light resistance without the scattering of the stabilizer and adverse effects of excessive blending on physical properties (mechanical characteristics and heat resistance).

SUMMARY OF THE INVENTION

The present inventors have discovered that a resin composition meeting the objective mentioned previously can be obtained by blending a specific compound that contains a, hindered amine function as a photostabilizer in a PPE resin (or this and a styrene resin) modified with an acid, an acid anhydride, an epoxy compound, etc. The present invention has been achieved.

In other words, the resin composition of the present invention is a material containing:

(A) 100 parts by weight of a resin obtained by the modification of at least one of a polyphenylene ether resin, or a mixture of polyphenylene ether type resin and a styrene resin consisting of the polyphenylene ether type resin and the styrene resin with at least one modifier compound selected from an acid, an acid anhydride and an epoxy compound, and (B) 0.1–5 parts by weight of a hindered amine compound that contains an amino group.

DETAILED DESCRIPTION OF THE INVENTION

The PPE-type resin that can be used in the present invention is the collective term of the polymers represented by the general formula (I), for example:

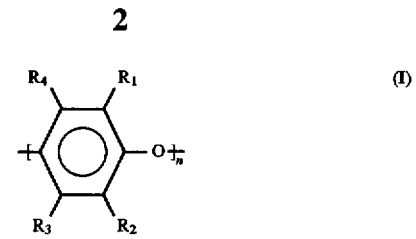

wherein $R_1$, $R_2$, $R_3$ and $R_4$ each independently represent monovalent substituent groups selected from hydrogen atoms, halogen atoms, alkyl groups, alkoxy groups, haloalkyl groups that have at least two carbon atoms between halogen atoms and phenyl rings, or haloalkoxy groups that contain no tertiary a-carbon, and n represents the degree of polymerization. It can be a single polymer represented by the general formula given previously or a copolymer obtained by the combination of two or more types. In the preferred specific examples, $R_1$ and $R_2$ are $C_1$–$C_4$ alkyl groups, and $R_3$ and $R_4$ are $C_1$–$C_4$ alkyl groups. For example, poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-methyl-6-propyl-1,4-phenylene) ether and so on can be mentioned. Furthermore, as the PPE copolymers, copolymers partly containing alkyl-trisubstituted phenols, such as 2,3,6-trimethylphenol, in the polyphenylene ether repeating unit can be mentioned. Moreover, in these PPE's, copolymers obtained by grafting of styrene-type compounds are also acceptable. The styrene-type-compound grafted polyphenylene ethers are the copolymers obtained by the graft polymerization of styrene, α-methylstyrene, vinyltoluene, chlorostyrene and so on, for example.

The styrene-type resins are themselves generally known. It is necessary that the repeating structure units derived from aromatic vinyl compounds represented by the general formula (if):

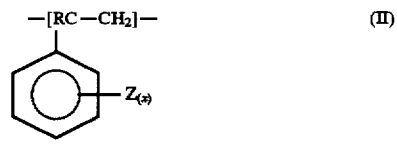

wherein R represents a hydrogen atom or a $C_1$–$C_4$ alkyl group, Z represents a halogen atom or a $C_1$–$C_4$ alkyl group as a substituent group, and x is an integer between 0 and 5 are contained to the extent of at least 25 wt% in the polymers. As the styrene compounds, styrene or its derivatives (such as o-methylstyrene, α-methylstyrene, α-methyl-o-methylstyrene, chlorostyrene, bromostyrene, and so on) as homopolymers, mixtures of polybutadiene, polyisoprene, butyl rubber, EPDM, ethylene-propylene copolymer, natural rubber and other elastomeric substances, or styrene-type copolymers modified by these, as well as styrene-containing copolymers, such as styreneacrylonitrile copolymer (SAN), styrene-butadiene copolymer, and styrene-acrylonitrile-butadiene copolymer (ABS) can be mentioned. As the preferred styrene-type resins of the present invention, homopolystyrene and rubber-reinforced polystyrene (HIPS) are available.

It is necessary that the PPE-type resins and the styrene-type resins mentioned previously are at least partly modified by at least one modifier compound selected from an acid, an acid anhydride and an epoxy compound. In such modification, either the PPE-type resin or the styrene-type resin may be modified. It is also acceptable that at least part o resins is modified. In either case, it is acceptable that one or both resins contain the unmodified resin.

As the compound which can be used in the modification of PPE, the following compounds are preferred. In other words, as acids and acid anhydrides, for example, maleic anhydride, maleic acid, fumaric acid, nadic methyl anhydride, dichloromaleic anhydride, (meth)acrylic acid, citric acid, malic acid, agaricic acid, itaconic acid, butenoic acid, crotonic acid, vinylacetic acid, pentenoic acid, 2-hexenoic acid, 2-octenoic acid, 2,4-hexadienoic acid, hexadecatrienoic acid, linoleic acid, linolenic acid, oleic acid, octacosenoic acid and so on can be mentioned. As the epoxy compounds, for example, glycidyl acrylate, glycidyl methacrylate and other glycidyl esters, acryl glycidyl ether and other glycidyl ethers and so on can be mentioned. The modification of the PPE-type resins can be carried out by publicly known methods. For example, the compounds and the PPE resins mentioned previously are melted and kneaded.

Moreover, as the compounds that can be used in the modification of styrene-type resins, maleic anhydride, maleic acid, (meth)acrylic acid, butenoic acid and other unsaturated acid compounds and their anhydrides or glycidyl methacrylate, glycidyl acrylate, vinyl glycidyl ether, hydroxyalkyl (meth) acrylate ethers and other unsaturated epoxy compounds are preferred. Said modification of the styrene-type resins can be carried out by the publicly known methods. For example, during the polymerization of styrene-type monomers, copolymers are manufactured by allowing the coexistence of the compounds mentioned previously.

There are no special restrictions on the amounts of modification when the PPE-type resins or styrene-type resins are modified. However, in order to enhance the effectiveness of the present invention sufficiently, it is preferable to carry out modification with a modifier compound in a proportion of at least 0.1 wt%, preferably 0.3-10 wt%.

The ratio of the PPE-type resin to the PS-type resin in (A) is preferably 90-10 parts by weight of the styrene-type resin with respect to 10-90 parts by weight of the PPE-type resin. Even more preferably, it is 80-20 parts by weight of the styrene-type resin with respect to 20-80 parts by weight of the PPE-type resin.

As the hindered amine compounds (B) that contain amino groups that can be used in the present invention, the compounds represented by the following formula (III):

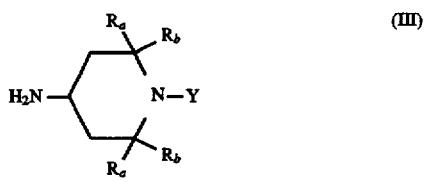

wherein $R_a$ and $R_b$ independently represent $C_1$-$C_8$ alkyl groups, and Y represents a hydrogen atom, an alkyl group or a phenylalkyl group can be preferably used. As the alkyl groups, for example, methyl groups, ethyl groups, propyl groups, butyl groups and other linear or branched, lower alkyl groups can be mentioned. In the case of phenyl alkyl groups, as the alkyl groups, the previously given lower alkyl groups can be mentioned. The phenyl groups may also be substituted with hydroxy groups, amino groups, alkyl groups, etc. Specifically, 4-amino-2,2,6,6-tetramethylpiperidine, N-methyl4-amino-2,2,6,6-tetramethylpiperidine, N-ethyl-4-amino-2,2,6,6-tetramethylpiperidine, N-benzyl-4-amino-2,2,6,6-tetramethylpiperidine and so on can be mentioned. Preferably, 4-amino-2,2,6,6-tetramethylpiperidine is used.

The hindered amine compound that (B) contains an amino group is blended at 0.1-5 parts by weight, preferably 0.3-3 parts by weight, with respect to 100 parts by weight of Component (A). If the amount of (B) is less than 0.1 part by weight, a sufficient light resistance cannot be obtained. If it exceeds 5 parts by weight, this will lead to a reduction in the mechanical strength and the heat resistance of the molded product.

In the resin composition of the present invention, as long as its properties are not damaged, depending on its purposes, during mixing or molding, other polymers, a variety of rubbers, customarily used additives, such as pigments, dyes, fillers (glass fibers, carbon fibers, carbon black, silica, titanium oxide and so on), heat-resistant agents, inhibitors of oxidative deterioration, weather-resistant agents, lubricants, mold-release agents, crystal-nucleating agents, plasticizers, difficultly combustible agents, electrostatic inhibitors and so on can be added.

There are no special restrictions on the methods for the manufacture of resin compositions of the present invention. Ordinary methods can be satisfactorily used. However, in general, the melt- kneading method is desirable. Although it is possible to use a small amount of the solvent, this is generally not required. As for the apparatuses, in particular, an extruder, a Banbury mixer, a rotor, a kneader and so on can be mentioned as examples. These may be operated batchwise or continuously.

APPLICATION EXAMPLES

The present invention will be further explained in detail with application examples in the following. However, the present invention is not to be restricted to these.

Component (A):

PPE-1: Poly(2,6-dimethyl-1,4-phenylene)ether with an intrinsic viscosity (in chloroform at 25° C.) of 0.48 dL/g, manufactured by Nippon G.E. Plastics Co. (called unmodified PPE).

PPE-2: A material obtained by blending 1.5 parts by weight of maleic anhydride with respect to 100 parts by weight of PPE-1 mentioned previously, followed by modification by the melting and kneading of this material (called modified PPE).

High-impact polystyrene (HIPS): tradename TOPOREX 870-ST, manufactured by Mitsui Toatsu Chemicals, Inc. (called unmodified PS).

Styrene-maleic anhydride copolymer: tradename DYLARK 232, manufactured by MTC Arco Co., maleic anhydride content 8 wt% (called modified PS-1).

Styrene-glycidyl methacrylate copolymer: tradename MARPROOF 1005S, manufactured by Nippon Oil and Fats Co., Ltd., glycidyl methacrylate content 5 wt% (called modified PS-2).

Component (B):

4-Amino-2,2,6,6-tetramethylpiperidine (manufactured by Tokyo Kasei Co., Ltd.).

Used in comparative examples:

SANOL LS-770 (tradename), manufactured by Sankyo Co., Ltd. (to be abbreviated to LS-770 hereinafter), having the following formula (IV):

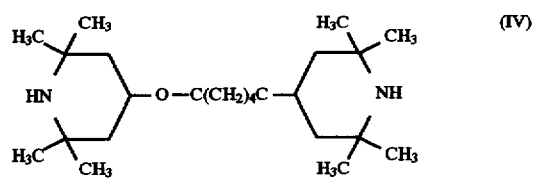

All compositions:
Titanium oxide (TiO$_2$)

Application Examples 1–3 and Comparative Example 1–2

The various components (parts by weight) shown in Table I were kneaded and extruded at 280° C. by using a biaxial extruder to prepare pellets.

From the pellets obtained, a variety of test species were molded by injection molding. The following characteristics were evaluated. The results are shown in Table I.

Light-Resistant color change

By using a fadometer manufactured by Atlas Co., and through a plate glass with a thickness of 3 mm, an accelerated test was carried out for 100 and 200 h. Next, by using a Hitachi CA-35 spectrometer, DYI was measured. A higher numerical value indicates a higher degree of yellowing.

Izod impact strength (notched)

Measured according to ASTM D-256

Thermal deformation temperature

Measured according to ASTM D-648 at a load of 18.6 kg/cm².

TABLE I

|  |  | Application example | | | Comparative example | |
|---|---|---|---|---|---|---|
|  |  | 1 | 2 | 3 | 1 | 2 |
| Composition (parts by weight) | | | | | | |
| (A) | Unmodified PPE | 50 | 50 | 25 | 50 | 50 |
|  | Modified PPE | — | — | 25 | — | — |
|  | Unmodified PS | 35 | 35 | 50 | 50 | 50 |
|  | Modified PS-1 | 15 | — | — | — | — |
|  | Modified PS-2 | — | 15 | — | — | — |
| (B) | 4-Amino-2,2,6,6-tetramethylpiperidine | 1 | 1 | 1 | — | — |
|  | LS-770 | — | — | — | 1 | — |
|  | TiO₂ | 5 | 5 | 5 | 5 | 5 |
| Characteristics | | | | | | |
| Light-resistant color change (DYI) | | | | | | |
|  | After 100 h | 3.5 | 3.2 | 3.2 | 6.8 | 9.9 |
|  | After 200 h | 22.5 | 21.8 | 21.2 | 25.0 | 31.1 |
| Izod impact strength (kg-cm/cm) | | 13 | 14 | 16 | 18 | 12 |
| Thermal deformation temperature (°C.) | | 133 | 129 | 130 | 122 | 131 |

It is seen from Table I that the resin compositions of the present invention are excellent in light resistance and exhibit good impact resistance and heat resistance.

The resin compositions of the present invention have an improved light resistance while a good impact resistance and heat resistance are maintained. They can be used in a variety of fields and are very useful.

I claim:

1. A heat resistant composition comprising:

(a) 100 parts by weight of at least one polyphenylene ether resin or a mixture of a polyphenylene ether resin and a styrene resin, wherein at least one of the polyphenylene ether resin or styrene resin is modified with at least one modifier compound selected from the group consisting of acid, acid anhydride, and epoxy compounds; and (b) 0.5 to 5 parts by weight of a hindered amine compound represented by the following formula:

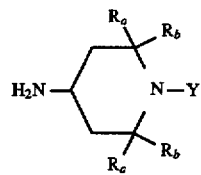

wherein $R_a$ and $R_b$ are independently $C_1$–$C_8$ alkyl groups, Y is a hydrogen atom, an alkyl group, or a phenylalkyl group.

2. The composition of claim 1 where the modifier of component (a) is present in at least 0.1 weight percent based on the weight of component (a).

3. The composition of claim 2 wherein the modifier is selected from the group consisting of glycidyl esters of malic acid, maleic anhydride, acrylic acid, and methacrylic acid.

4. The composition of claim 1 wherein the styrene resin is selected from the group consisting of polystyrene, high impact polystyrene, styrene-maleic anhydride copolymer, styrene-glycidyl methacrylate copolymer, and mixtures of the foregoing.

5. The composition of claim 1 wherein the hindered amine is 4-amino-2,2,6,6-tetramethylpiperidine.

6. The composition of claim 5 wherein the hindered amine is present between about 0.3 to 3 parts by weight based on the weight of component (a).

7. The composition of claim 1 wherein the light resistant color change after 200 hours is at least 10% improved over the same composition not containing either the modifier of component (a) or the hindered amine compound that contains the amino group of component (b).

8. A heat resistant composition consisting essentially of:

a) 100 parts by weight of at least one polyphenylene ether resin or a mixture of a polyphenylene ether resin and a styrene resin, wherein at least one of the polyphenylene ether resin or styrene resin is modified with at least one modifier compound selected from the group consisting of acid, acid anhydride, and epoxy compounds; and (b) 0.5 to 5 parts by weight of a hindered amine compound represented by the following formula:

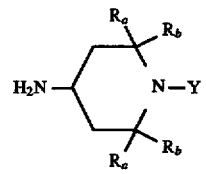

wherein $R_a$ and $R_b$ are independently $C_1$–$C_8$ alkyl groups, Y is a hydrogen atom, an alkyl group, or a phenylalkyl group.

9. The composition of claim 8, wherein the modifier of component (a) is present in at least 0.1 weight percent based on the weight of component (a).

10. The composition of claim 9, wherein the modifier is selected from the group consisting of glycidyl esters of malic acid, maleic anhydride, acrylic acid, and methacrylic acid.

11. The composition of claim 8, wherein the styrene resin is selected from the group consisting of polystyrene, high impact polystyrene, styrene-maleic anhydride copolymer, styrene-glycidyl methacrylate copolymer, and mixtures of the foregoing.

12. The composition of claim 8, wherein the hindered amine is 4-amino-2,2,6,6-tetramethylpiperidine.

* * * * *